(12) United States Patent
Kawasuji (10) Patent No.: US 10,868,403 B2
(45) Date of Patent: Dec. 15, 2020

(54) LASER APPARATUS AND EXTREME ULTRAVIOLET LIGHT GENERATION SYSTEM

(71) Applicant: Gigaphoton Inc., Tochigi (JP)

(72) Inventor: Yasufumi Kawasuji, Tochigi (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 16/502,053

(22) Filed: Jul. 3, 2019

(65) Prior Publication Data

US 2019/0326722 A1 Oct. 24, 2019

Related U.S. Application Data

(63) Continuation of application No. PCT/JP2017/007436, filed on Feb. 27, 2017.

(51) Int. Cl.
*H01S 3/10* (2006.01)
*H01S 3/034* (2006.01)
*H01S 3/223* (2006.01)

(52) U.S. Cl.
CPC .......... *H01S 3/10015* (2013.01); *H01S 3/034* (2013.01); *H01S 3/10023* (2013.01); *H01S 3/2232* (2013.01)

(58) Field of Classification Search
CPC .. H01S 3/10015; H01S 3/034; H01S 3/10023; H01S 3/2232; H01S 3/005;
(Continued)

(56) References Cited

U.S. PATENT DOCUMENTS

2007/0146695 A1* 6/2007 Brouwer ............... B82Y 10/00
356/237.4
2010/0078577 A1* 4/2010 Moriya .................... H01S 3/10
250/504 R
(Continued)

FOREIGN PATENT DOCUMENTS

JP    H11306586 A    11/1999
JP    2012147022 A    8/2012
(Continued)

OTHER PUBLICATIONS

International Search Report issued in PCT/JP2017/007436; dated Apr. 25, 2017.
(Continued)

*Primary Examiner* — Xinning(Tom) Niu
(74) *Attorney, Agent, or Firm* — Studebaker & Brackett PC (57) ABSTRACT

A laser apparatus of the present disclosure includes: a master oscillator configured to emit a laser beam; a laser amplifier disposed on an optical path of the laser beam; a propagation optical system disposed on an optical path between the laser amplifier and a target supplied into an EUV chamber in which EUV light is generated; and a polarization isolator disposed on an optical path between the laser amplifier and the propagation optical system. The polarization isolator includes: a polarizer configured to emit, selecting from the laser beam incident on the polarizer, a laser beam linearly polarized in a predetermined polarization direction; and a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system.

5 Claims, 9 Drawing Sheets

(58) Field of Classification Search
CPC .... H01S 3/0064; H01S 3/2316; H01S 3/2366; H05G 2/008
See application file for complete search history.

(56) References Cited

U.S. PATENT DOCUMENTS

| | | | |
|---|---|---|---|
| 2013/0322482 A1* | 12/2013 | Sandstrom | H01S 3/08 |
| | | | 372/50.11 |
| 2015/0340838 A1 | 11/2015 | Moriya et al. | |
| 2016/0087389 A1 | 3/2016 | Niwano et al. | |
| 2016/0285222 A1 | 9/2016 | Suganuma et al. | |

FOREIGN PATENT DOCUMENTS

| | | |
|---|---|---|
| WO | 2014119199 A1 | 8/2014 |
| WO | 2015/012099 A1 | 1/2015 |
| WO | 2015/111510 A1 | 7/2015 |

OTHER PUBLICATIONS

International Preliminary Report on Patentability and Written Opinion issued in PCT/JP2017/007436; dated Aug. 27, 2019.

* cited by examiner

LASER APPARATUS AND EXTREME ULTRAVIOLET LIGHT GENERATION SYSTEM

CROSS-REFERENCE TO RELATED APPLICATIONS

The present application is a continuation application of International Application No. PCT/JP2017/007436 filed on Feb. 27, 2017. The content of the application is incorporated herein by reference in its entirety.

BACKGROUND

1. Technical Field

The present disclosure relates to a laser apparatus and an EUV light generation system.

2. Related Art

Recently, miniaturization of a transfer pattern in optical lithography of a semiconductor process has been rapidly proceeding along with miniaturization of the semiconductor process. Minute fabrication at 20 nm or smaller will be requested in the next generation technology. To meet the request for minute fabrication at 20 nm or smaller, for example, it is desired to develop an exposure device including an extreme ultraviolet (EUV) light generation device configured to generate extreme ultraviolet light at a wavelength of 13 nm approximately in combination with reduced projection reflective optics.

Disclosed EUV light generation devices include the three kinds of devices of a laser produced plasma (LPP) device that uses plasma generated by irradiating a target material with a laser beam, a discharge produced plasma (DPP) device that uses plasma generated by electrical discharge, and a synchrotron radiation (SR) device that uses synchrotron radiation.

LIST OF DOCUMENTS

Patent Documents

Patent Document 1: Japanese Unexamined Patent Application Publication No. 11-306586
Patent Document 2: Japanese Unexamined Patent Application Publication No. 2012-147022
Patent Document 3: International Patent Publication No. 2015/111510

SUMMARY

A laser apparatus of the present disclosure includes: a master oscillator configured to emit a laser beam; a laser amplifier disposed on an optical path of the laser beam; a propagation optical system disposed on an optical path between the laser amplifier and a target supplied into an EUV chamber in which EUV light is generated; and a polarization isolator disposed on an optical path between the laser amplifier and the propagation optical system. The polarization isolator includes: a polarizer configured to emit, selecting from the laser beam incident on the polarizer, a laser beam linearly polarized in a predetermined polarization direction; and a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system.

An EUV light generation system of the present disclosure includes a laser apparatus, and an EUV chamber in which EUV light is generated. The laser apparatus includes: a master oscillator configured to emit a laser beam; a laser amplifier disposed on an optical path of the laser beam; a propagation optical system disposed on an optical path between the laser amplifier and a target supplied into the EUV chamber; and a polarization isolator disposed on an optical path between the laser amplifier and the propagation optical system. The polarization isolator includes: a polarizer configured to emit, selecting from the laser beam incident on the polarizer, a laser beam linearly polarized in a predetermined polarization direction; and a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system.

BRIEF DESCRIPTION OF THE DRAWINGS

Embodiments of the present disclosure will be described below as examples with reference to the accompanying drawings.

DESCRIPTION OF EMBODIMENTS

<Contents>
<1. Overall Description of EUV Light Generation Device> (FIG. 1)
  1.1 Configuration
  1.2 Operation
<2. Comparative Example> (Laser Apparatus Including Polarization Isolator) (FIGS. 2 to 4)
  2.1 Laser apparatus including polarization isolator
    2.1.1 Configuration
    2.1.2 Operation
    2.1.3 Effects
  2.2 Polarization isolator including reflection retarder
    2.2.1 Configuration
    2.2.2 Operation
    2.2.3 Effects
  2.3 Problem
<3. Embodiment 1> (First Laser Apparatus Configured to Compensate Retardation of Propagation Optical System) (FIGS. 5 to 7)
  3.1 Configuration
  3.2 Operation
  3.3 Effects
  3.4 Modification
    3.4.1 Configuration
    3.4.2 Operation
    3.4.3 Effects
<4. Embodiment 2> (Second Laser Apparatus Configured to Compensate Retardation of Propagation Optical System) (FIGS. 8 and 9)
  4.1 Configuration and operation
  4.2 Effects
<5. Embodiment 3> (Third Laser Apparatus Configured to Compensate Retardation of Propagation Optical System) (FIG. 10)
  5.1 Configuration and operation
  5.2 Effects
<6. Others>

Embodiments of the present disclosure will be described below in detail with reference to the accompanying drawings.

The embodiments described below are examples of the present disclosure, and do not limit the contents of the present disclosure. Not all configurations and operations described in each embodiment are necessarily essential as configurations and operations of the present disclosure.

Components identical to each other are denoted by an identical reference sign, and duplicate description thereof will be omitted.

<1. Overall Description of EUV Light Generation Device>

[1.1 Configuration]

Figure 1:
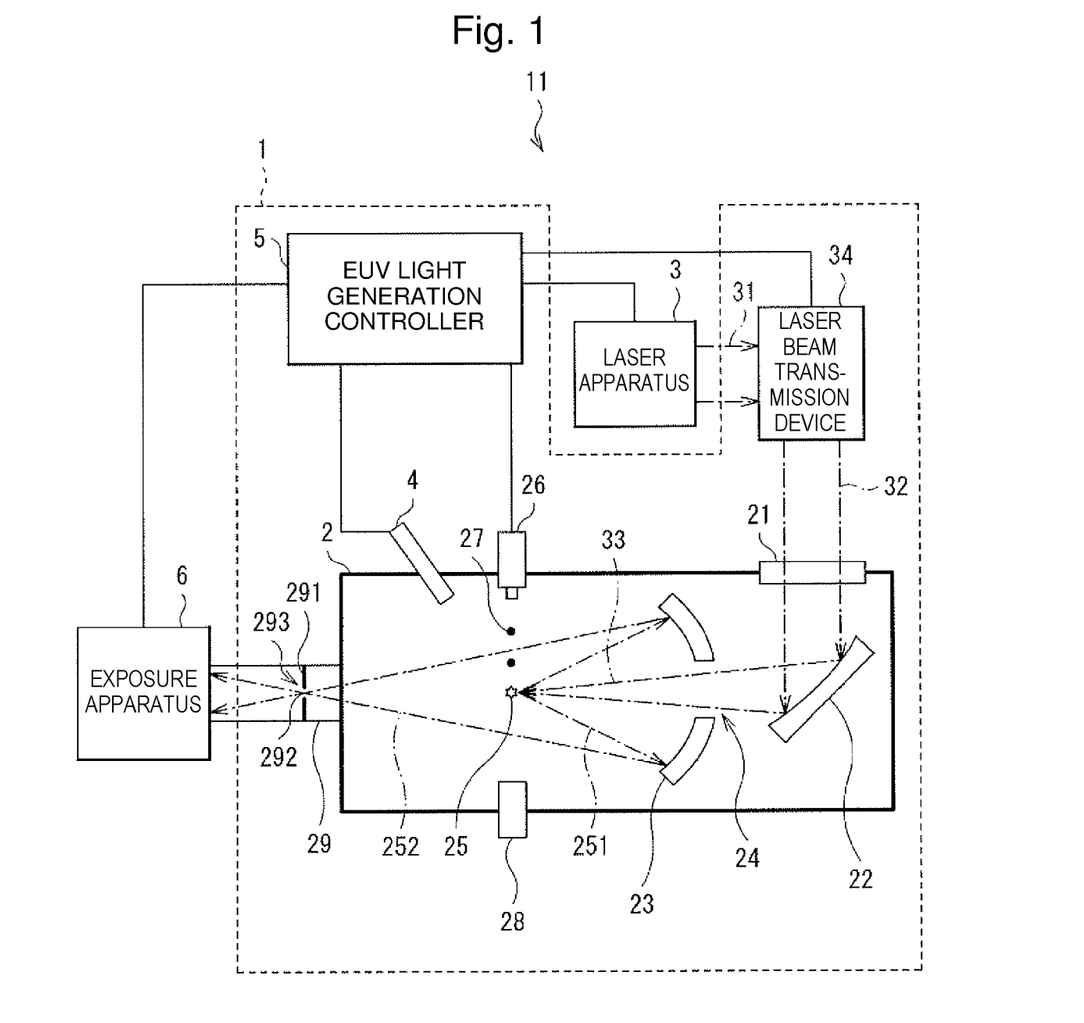
FIG. 1 schematically illustrates an exemplary configuration of an exemplary LPP EUV light generation system.

FIG. 1 schematically illustrates an exemplary configuration of an LPP EUV light generation system. This EUV light generation device 1 is used together with at least one laser apparatus 3 in some cases. In the present application, a system including the EUV light generation device 1 and the laser apparatus 3 is referred to as an EUV light generation system 11. As illustrated in FIG. 1 and described below in detail, the EUV light generation device 1 includes a chamber 2 and a target supply unit 26. The chamber 2 is a sealable container. The target supply unit 26 supplies a target substance into the chamber 2 and is attached, for example, through a wall of the chamber 2. The material of the target substance may be tin, terbium, gadolinium, lithium, xenon, or a combination of two or more thereof, but is not limited thereto.

The wall of the chamber 2 is provided with at least one through-hole. A window 21 blocks the through-hole and transmits a pulse laser beam 32 output from the laser apparatus 3. For example, an EUV focusing mirror 23 having a spheroidal reflection surface is disposed inside the chamber 2. The EUV focusing mirror 23 has first and second focal points. A multi-layer reflective film in which, for example, molybdenum and silicon are alternately stacked is formed on a surface of the EUV focusing mirror 23. The EUV focusing mirror 23 may be disposed so that, for example, the first focal point is positioned in a plasma generating region 25 and the second focal point is positioned at an intermediate focus point (IF) 292. A through-hole 24 is provided at a central part of the EUV focusing mirror 23, and a pulse laser beam 33 passes through the through-hole 24.

The EUV light generation device 1 includes, for example, an EUV light generation controller 5 and a target sensor 4. The target sensor 4 detects one or a plurality of the existence, locus, position, and speed of a target 27. The target sensor 4 may have an image capturing function.

The EUV light generation device 1 includes a connection unit 29 that provides communication between inside of the chamber 2 and inside of an exposure apparatus 6. A wall 291 through which an aperture 293 is formed is provided inside the connection unit 29. The wall 291 is disposed so that the aperture 293 is positioned at the second focal position of the EUV focusing mirror 23.

In addition, the EUV light generation device 1 includes, for example, a laser beam transmission device 34, a laser beam focusing mirror 22, and a target recovery unit 28 for collecting the target 27. The laser beam transmission device 34 includes an optical element for defining the transmission state of a laser beam, and an actuator for adjusting the position, posture, and the like of the optical element.

[1.2 Operation]

The following describes operation of the exemplary LPP EUV light generation system with reference to FIG. 1. A pulse laser beam 31 output from the laser apparatus 3 passes through the laser beam transmission device 34 and enters the chamber 2 through the window 21 as the pulse laser beam 32. The pulse laser beam 32 travels inside the chamber 2 along at least one laser beam path, and is reflected by the laser beam focusing mirror 22 and applied on the at least one target 27 as the pulse laser beam 33.

The target supply unit 26 outputs the target 27 made of the target substance toward the plasma generating region 25 inside the chamber 2. The target 27 is irradiated with at least one pulse included in the pulse laser beam 33. When irradiated with the pulse laser beam, the target 27 generates plasma from which radiation light 251 is radiated. EUV light 252 included in the radiation light 251 is selectively reflected by the EUV focusing mirror 23. After reflected by the EUV focusing mirror 23, the EUV light 252 is focused at the intermediate focus point 292 and output to the exposure apparatus 6. Here, one target 27 may be irradiated with a plurality of pulses included in the pulse laser beam 33.

The EUV light generation controller 5 collectively controls the entire EUV light generation system 11. The EUV light generation controller 5 processes a result of detection by the target sensor 4. The EUV light generation controller 5 may control, for example, the output timing and output direction of the target 27 based on the result of detection by the target sensor 4. In addition, the EUV light generation controller 5 may control, for example, the oscillation timing of the laser apparatus 3, the traveling direction of the pulse laser beam 32, the focusing position of the pulse laser beam 33, and the like. These various kinds of control are merely exemplary, and other kinds of control may be added as necessary.

<2. Comparative Example> (Laser Apparatus Including Polarization Isolator)

[2.1.1 Configuration]

Figure 2:
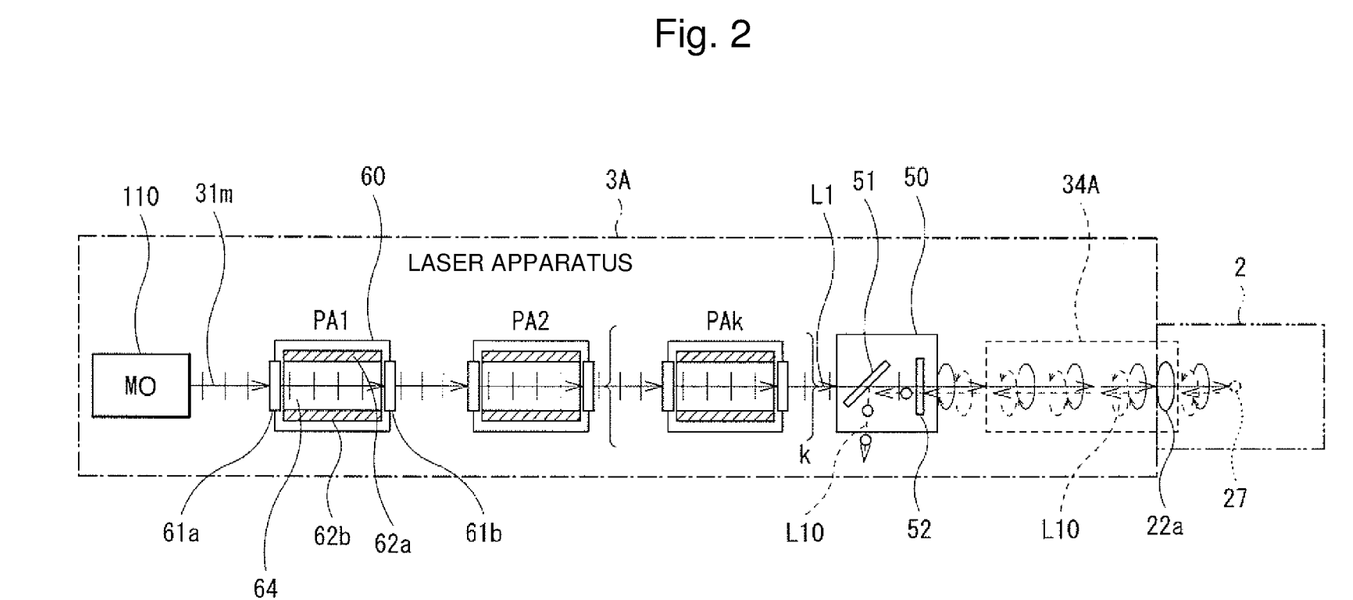
FIG. 2 schematically illustrates an exemplary configuration of a laser apparatus according to a comparative example applied to the EUV light generation system.

FIG. 2 schematically illustrates an exemplary configuration of a laser apparatus 3A according to a comparative example applied to, for example, the EUV light generation system 11 illustrated in FIG. 1. Hereinafter, any component substantially identical to that in FIG. 1 is denoted by an identical reference sign, and description thereof will be omitted as appropriate.

The laser apparatus 3A includes a master oscillator (MO) 110, a laser amplifier, a polarization isolator 50, and a propagation optical system 34A.

The master oscillator 110 may be a $CO_2$ laser oscillator including a Q switch, $CO_2$ laser gas as a laser medium, and an optical resonator. Alternatively, the master oscillator 110 may be a quantum cascade laser (QCL) configured to oscillate in an amplification wavelength band of $CO_2$ laser gas.

The master oscillator 110 outputs a pulse laser beam 31m having a predetermined repetition frequency. The master oscillator 110 outputs, as the pulse laser beam 31m, a pulse laser beam having a wavelength at an amplification line of $CO_2$ laser gas and linearly polarized in a predetermined polarization direction.

The laser amplifier is disposed on the optical path of the pulse laser beam 31m output from the master oscillator 110. The laser amplifier includes at least one amplifier PAk. The laser amplifier may include a plurality of amplifiers PA1, PA2, . . . , PAk.

The amplifiers PA1, PA2, . . . , PAk may be each a laser amplifier including $CO_2$ laser gas as a laser medium. The amplifiers PA1, PA2, . . . , PAk may each include a pair of electrodes 62a and 62b disposed in a laser chamber 60 including $CO_2$ laser gas. The amplifiers PA1, PA2, . . . , PAk may each include a RF (high-frequency) power source (not illustrated) configured to apply voltage between the pair of electrodes 62a and 62b. The pair of electrodes 62a and 62b are discharge electrodes configured to excite the laser medium in a discharge region 64 by electrical discharging. The amplifiers PA1, PA2, . . . , PAk are each provided with an input window 61a through which a pulse laser beam from the outside enters the laser chamber 60. In addition, the amplifiers PA1, PA2, . . . , PAk are each provided with an output window 61b through which an amplified pulse laser beam is output out of the laser chamber 60. The amplifiers PA1, PA2, . . . , PAk are disposed in series on the optical path of the pulse laser beam 31m output from the master oscillator 110.

The laser amplifier may be a three-axis orthogonal type amplifier or a fast axial-flow type amplifier.

The propagation optical system 34A is disposed on an optical path between the amplifier PAk and the target 27 supplied in the chamber 2 as an EUV chamber. The propagation optical system 34A may include a laser focusing optical system 22a configured to focus the pulse laser beam to the target 27. The propagation optical system 34A corresponds to, for example, an optical system in the laser beam transmission device 34 and the laser beam focusing mirror 22 in the EUV light generation system in FIG. 1.

The polarization isolator 50 is disposed on an optical path between the amplifier PAk and the propagation optical system 34A. The polarization isolator 50 includes a polarizer 51 and a retarder 52.

The polarizer 51 emits, selecting from the laser beam incident on the polarizer, a laser beam linearly polarized in a predetermined polarization direction. The polarizer 51 is a transmission polarizer configured to highly transmit a laser beam linearly polarized in a predetermined polarization direction. Alternatively, a reflection polarizer 51A illustrated in FIG. 3 to be described later may be used in place of the transmission polarizer.

The polarizer 51 as a transmission polarizer may be a polarizer configured to highly transmit a laser beam linearly polarized in a predetermined polarization direction and highly reflect a laser beam having linear polarization orthogonal to linear polarization in the predetermined polarization direction, and may be a polarizing beam splitter or a polarizing prism. Alternatively, the polarizer 51 as a transmission polarizer may be, for example, a TFP (thin-film polarizer) having a structure in which a substrate mainly made of diamond, ZnSe, or GaAs, which transmits a $CO_2$ laser beam, is coated with a multi-layered film configured to highly transmit a laser beam P having polarization as linear polarization in the predetermined polarization direction and highly reflect a laser beam having S polarization. Alternatively, the polarizer 51 as a transmission polarizer may be a wire-grid polarizer.

The retarder 52 may be an optical element configured to rotate the phase difference of incident linearly polarized light by 45° and output the light as circularly polarized light. The retarder 52 is, for example, a transmission retarder. The retarder 52 as a transmission retarder may be a transmission $\lambda/4$ wave plate. Alternatively, a reflection retarder 52A illustrated in FIG. 3 to be described later may be used in place of the transmission retarder.

[2.1.2 Operation]

The following describes an example in which the polarizer 51 is a transmission polarizer and the retarder 52 is a transmission retarder. The following description assumes that no retardation occurs at the propagation optical system 34A. The pulse laser beam 31m linearly polarized in the predetermined polarization direction and output from the master oscillator 110 is amplified through the amplifiers PA1, PA2, . . . , PAk. The amplifier PAk outputs an amplified pulse laser beam L1. The amplified pulse laser beam L1 enters the polarization isolator 50. The amplified pulse laser beam L1 has linear polarization in the predetermined polarization direction, which is same as that of the pulse laser beam 31m output from the master oscillator 110, and highly transmits through the polarizer 51.

After having highly transmitted through the polarizer 51, the pulse laser beam L1 obtains a phase difference of 45° as highly transmitting through the retarder 52, and is converted into circularly polarized light. The circularly polarized pulse laser beam L1 passes through the propagation optical system 34A, and is focused through the laser focusing optical system 22a and applied on the target 27.

When the circularly polarized pulse laser beam L1 is applied on the target 27, part of the pulse laser beam L1 is reflected at the target 27 to generate reflected light. The reflected light may become a returning laser beam L10 traveling backward through the propagation optical system 34A. The returning laser beam L10 may have circular polarization in a polarization direction opposite to that of the circular polarization of the pulse laser beam L1 applied on the target 27. The returning laser beam L10 is collimated through the laser focusing optical system 22a, and may return in the opposite direction on an optical path identical to that of the pulse laser beam L1.

The oppositely circularly polarized returning laser beam L10 passes through the retarder 52 and is converted into linearly polarized light orthogonal to the polarization direction of the pulse laser beam L1 incident on the retarder 52. Accordingly, the returning laser beam L10 is highly reflected by the polarizer 51 and deviated from the optical path of the pulse laser beam L1. In addition, a linear polarization component of reflected light from an optical element including a window and an aperture and disposed on an optical path downstream of the polarization isolator 50, the linear polarization component being orthogonal to the polarization direction of the pulse laser beam L1 incident on the retarder 52, is highly reflected by the polarizer 51 and deviated from the optical path of the pulse laser beam L1.

[2.1.3 Effects]

The disposition of the polarization isolator 50 can prevent the returning laser beam L10 from the target 27 from reaching an optical path upstream of the installation position of the polarization isolator 50, in other words, an optical path on the master oscillator 110 side of the polarization isolator 50. The disposition of the polarization isolator 50 can also prevent propagation of reflected light from the optical element including a window and an aperture and disposed on the optical path downstream of the polarization isolator 50, in other words, an optical path on the target 27 side of the polarization isolator 50.

[2.2 Polarization Isolator Including Reflection Retarder]
[2.2.1 Configuration]

Figure 3:
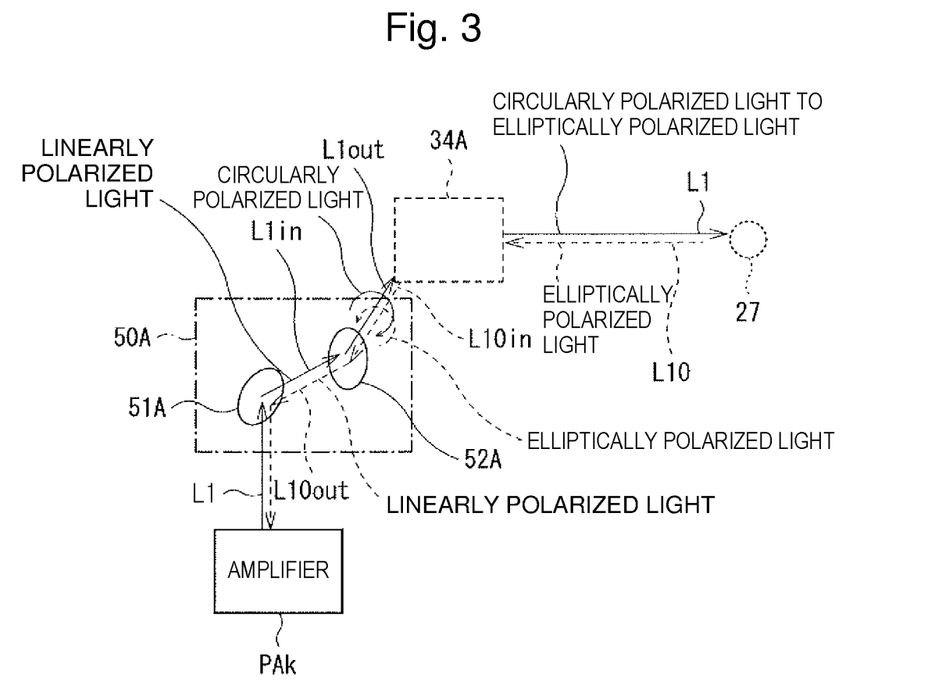
FIG. 3 schematically illustrates an exemplary polarization isolator according to the comparative example including a reflection retarder.

FIG. 3 schematically illustrates an exemplary polarization isolator 50A according to the comparative example including the reflection retarder 52A.

The polarization isolator 50A including the reflection polarizer 51A and the reflection retarder 52A may be used in the laser apparatus 3A illustrated in FIG. 2.

The reflection polarizer 51A is a reflective polarizer that highly reflects a laser beam linearly polarized in a predetermined polarization direction. The reflection polarizer 51A is disposed to highly reflect the pulse laser beam L1 linearly polarized in the predetermined polarization direction and output from the amplifier PAk. The reflection polarizer 51A may be a polarizer that highly reflects a laser beam linearly polarized in the predetermined polarization direction and absorbs a laser beam having linear polarization orthogonal to linear polarization of the predetermined polarization direction. The reflection polarizer 51A may have a structure in which a substrate is coated with a multi-layered film that highly reflects a laser beam having P polarization as linear polarization in the predetermined polarization direction and highly transmits an S-polarized laser beam. The S-polarized laser beam having transmitted through the multi-layered film is absorbed by the substrate. Thus, the substrate may be water-cooled. In this case, the multi-layered film may be a multi-layered film in which a film made of a high refractive-index material and a film of a low refractive-index material are alternately stacked. The high refractive-index material may be at least one of ZnSe and ZnS. The low refractive-index material may be at least one of $ThF_4$ and $PbF_2$. The reflection polarizer 51A may be ATFR manufactured by II-VI Incorporated.

The reflection retarder 52A is an optical element that rotates, through reflection, the phase difference of incident linearly polarized light by 45° and outputs the light as circularly polarized light. The reflection retarder 52A may be a reflection λ/4 plate. The reflection retarder 52A may be RPR manufactured by II-VI Incorporated.

Figure 4:
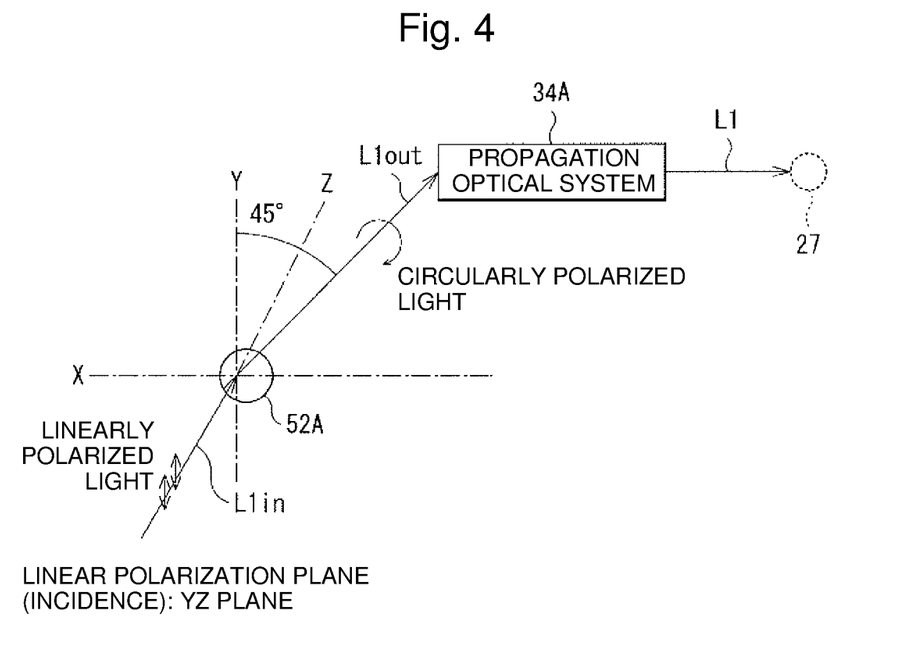
FIG. 4 schematically illustrates exemplary arrangement of the reflection retarder according to the comparative example.

FIG. 4 illustrates exemplary arrangement of the reflection retarder 52A according to the comparative example.

The reflection retarder 52A is disposed to convert, through reflection, the pulse laser beam L1 linearly polarized in the predetermined polarization direction and emitted from the reflection polarizer 51A into circularly polarized light.

In FIG. 4, a Z axis is defined to be the optical axis of incident light L1in as the pulse laser beam L1 toward the reflection retarder 52A. The incident light L1in is light linearly polarized in a predetermined polarization direction to which a Y axis is defined to be parallel. The linear polarization direction of the incident light L1in is included in a YZ plane. An X axis is defined to be orthogonal to the Z axis and the Y axis. In embodiments described below, the incident light L1in has the same optical axis direction and the same polarization direction.

The reflection retarder 52A is disposed so that a reflected light L1out of the pulse laser beam L1 through the reflection retarder 52A has an optical axis direction at 45° relative to the Y axis on an XY plane. With this configuration, when incident on the reflection polarizer 51A, the pulse laser beam L1 linearly polarized in the predetermined polarization direction is converted into circularly polarized light.

[2.2.2 Operation]

The following description assumes that no retardation occurs at the propagation optical system 34A. The pulse laser beam L1 output from the amplifier PAk enters the polarization isolator 50A. The pulse laser beam L1 output from the amplifier PAk is light linearly polarized in the predetermined polarization direction, and is highly reflected by the reflection polarizer 51A.

After having been highly reflected by the reflection polarizer 51A, the pulse laser beam L1 obtains a phase difference of 45° as highly reflected by the reflection retarder 52A, and is converted into circularly polarized light. The circularly polarized pulse laser beam L1 passes through the propagation optical system 34A, and is focused through the laser focusing optical system 22a and applied on the target 27.

When the circularly polarized pulse laser beam L1 is applied on the target 27, part of the pulse laser beam L1 is reflected at the target 27 to generate reflected light. The reflected light may become the returning laser beam L10 traveling backward through the propagation optical system 34A. The returning laser beam L10 may have circular polarization in a polarization direction opposite to that of the circular polarization of the pulse laser beam L1 applied on the target 27. The returning laser beam L10 is collimated through the laser focusing optical system 22a, and may return in the opposite direction on an optical path identical to that of the pulse laser beam L1.

The oppositely circularly polarized returning laser beam L10 is converted, through reflection by the reflection retarder 52A, into linearly polarized light orthogonal to the polarization direction of the incident light L1in as the pulse laser beam L1 toward the reflection retarder 52A. Accordingly, the returning laser beam L10 is absorbed by the reflection polarizer 51A. In addition, a linear polarization component of reflected light from an optical element including a window and an aperture and disposed on an optical path downstream of the polarization isolator 50A, the linear polarization component being orthogonal to the polarization direction of the pulse laser beam L1 incident on the reflection retarder 52A, is absorbed by the reflection polarizer 51A.

[2.2.3 Effects]

The disposition of the polarization isolator 50A can prevent the returning laser beam L10 from the target 27 from reaching an optical path upstream of the installation position of the polarization isolator 50A, in other words, an optical path on the master oscillator 110 side of the polarization isolator 50A. The disposition of the polarization isolator 50A can also prevent propagation of reflected light from an optical element including a window and an aperture and disposed on the optical path downstream of the polarization isolator 50A, in other words, an optical path on the target 27 side of the polarization isolator 50.

[2.3 Problem]

The above description assumes that no retardation occurs at the propagation optical system 34A, but in reality, retardation can occur at the propagation optical system 34A. Retardation at each optical element included in the propagation optical system 34A is accumulated and transferred.

As illustrated in, for example, FIG. 3, the pulse laser beam L1 converted into circularly polarized light through high reflection by the reflection retarder 52A receives retardation accumulated through each optical element included in the propagation optical system 34A as passing through the propagation optical system 34A, and may become elliptically polarized light when reaching the target 27. Accordingly, the returning laser beam L10 from the target 27 may become elliptically polarized light in a polarization direction opposite to that of elliptical polarization of the pulse laser beam L1 having reached the target 27.

The oppositely elliptically polarized returning laser beam L10 remains as oppositely elliptically polarized light after having passed through the propagation optical system 34A. Incident light L10in as the returning laser beam L10 toward the reflection retarder 52A is oppositely elliptically polarized light as well. Thus, reflected light L10out as the returning laser beam L10 from the reflection retarder 52A is not completely converted into linearly polarized light orthogonal to light linearly polarized in the predetermined polarization direction by the reflection retarder 52A, but partially becomes light linearly polarized in the predetermined polarization direction. Accordingly, the reflected light L10out as the returning laser beam L10 from the reflection retarder 52A is not completely absorbed by the reflection polarizer 51A, but a partial component thereof reaches the optical path upstream of the installation position of the polarization isolator 50A, in other words, the optical path on the master oscillator 110 side of the polarization isolator 50A. As a result, the returning laser beam L10 damages an optical element disposed on the optical path upstream of the installation position of the polarization isolator 50A. In addition, a return light component of amplified spontaneous emission (ASE) light generated by the laser amplifier is likely to return to the laser amplifier. Accordingly, self-oscillation is likely to occur at the laser amplifier, which puts constraint on the gain upper limit of the laser amplifier and restriction on laser output as a result.

To solve the above-described problem, it has been desired to develop a technology of compensating retardation occurring at the propagation optical system 34A. Each of the embodiments below relates to a technology of disposing the reflection retarder 52A so that retardation occurring at the propagation optical system 34A is compensated.

The embodiments below describe examples with the polarization isolator 50A including the reflection polarizer 51A and the reflection retarder 52A, but a transmission polarizer may be used in place of the reflection polarizer 51A. In other words, a polarization isolator including the transmission polarizer and the reflection retarder 52A in combination may be used.

In the embodiments below, the reflection retarder 52A is disposed to convert, through reflection, the pulse laser beam L1 linearly polarized in the predetermined polarization direction and incident on the reflection retarder 52A into an elliptically polarized laser beam having retardation that reduces retardation occurring at the propagation optical system 34A. It is preferable that the reflection retarder 52A is disposed to convert the pulse laser beam L1 into an elliptically polarized laser beam having retardation that compensates and cancels retardation occurring at the propagation optical system 34A.

<3. Embodiment 1> (First Laser Apparatus Configured to Compensate Retardation of Propagation Optical System)

The following describes a laser apparatus according to Embodiment 1 of the present disclosure. Hereinafter, any component substantially identical to that of the laser apparatus 3A according to the comparative example described above is denoted by an identical reference sign, and description thereof will be omitted as appropriate.

[3.1 Configuration]

Figure 5:
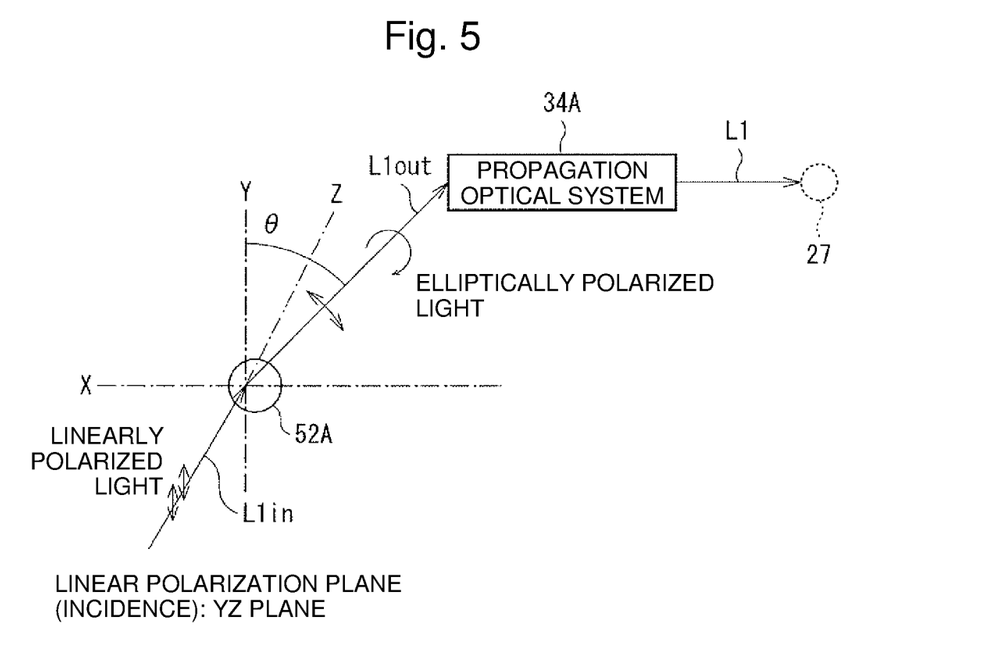
FIG. 5 schematically illustrates exemplary arrangement of a reflection retarder in a laser apparatus according to Embodiment 1.

FIG. 5 schematically illustrates exemplary arrangement of the reflection retarder 52A in the laser apparatus according to Embodiment 1.

In Embodiment 1, the reflection retarder 52A is disposed so that the reflected light L1out as the pulse laser beam L1 from the reflection retarder 52A has a reflection direction at an angle θ relative to the Y axis on the XY plane. The angle θ is an angle with which a laser beam linearly polarized in a predetermined polarization direction is converted into an elliptically polarized laser beam having retardation that compensates retardation occurring at the propagation optical system 34A.

Figure 6:
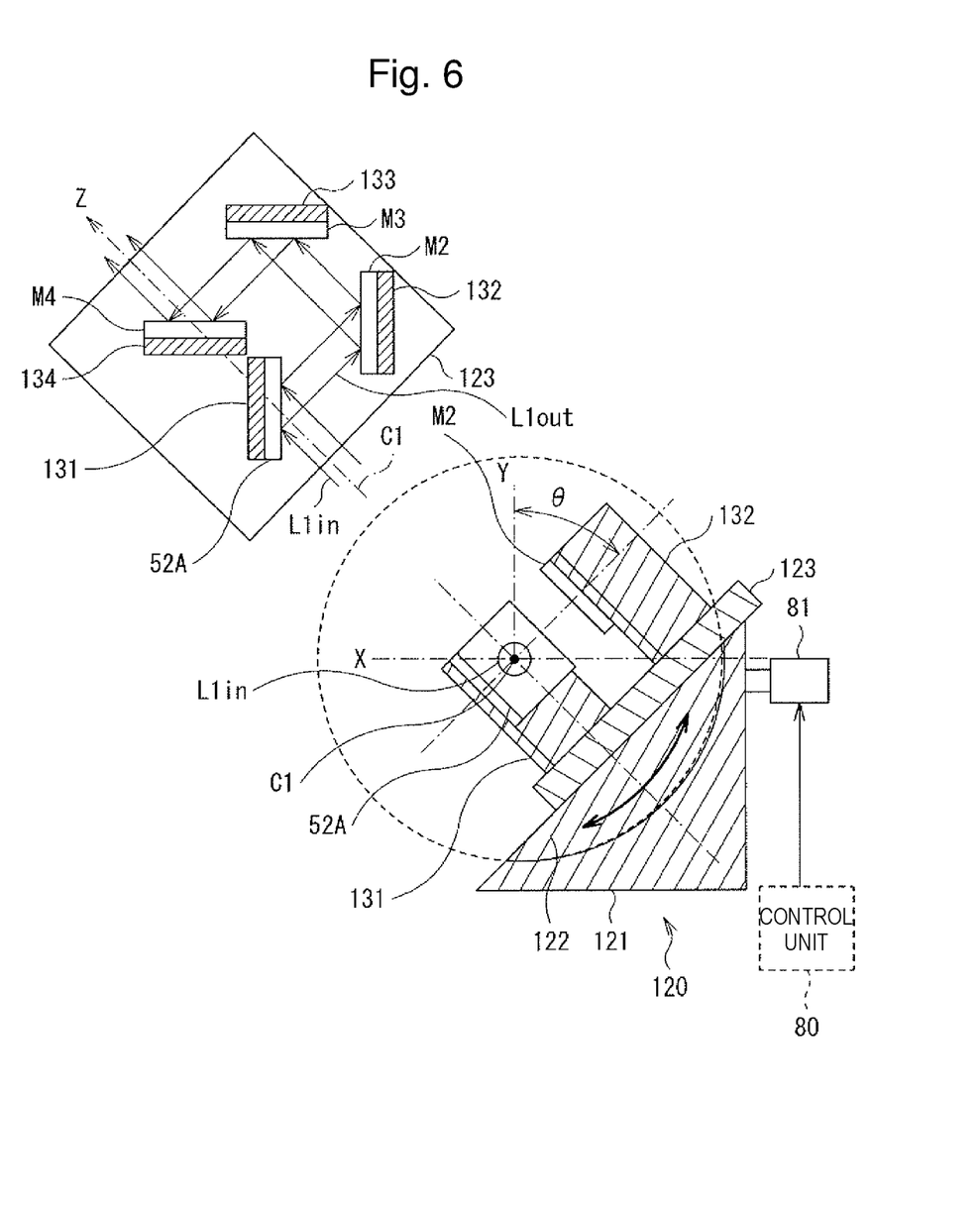
FIG. 6 schematically illustrates an exemplary configuration of an arrangement adjusting mechanism of the reflection retarder in the laser apparatus according to Embodiment 1.

FIG. 6 schematically illustrates an exemplary configuration of an arrangement adjusting mechanism of the reflection retarder 52A in the laser apparatus according to Embodiment 1.

The arrangement adjusting mechanism adjusts the angle θ illustrated in FIG. 5 by adjusting the orientation of the reflection retarder 52A. The arrangement adjusting mechanism includes a gonio stage 120 and an actuator 81 configured to drive the gonio stage 120.

The gonio stage 120 includes a fixation stage 121, a movable portion 122, and a fixation stage 123. The movable portion 122 is rotatable about a rotation center axis C1 relative to the fixation stage 121. The fixation stage 123 is fixed to the movable portion 122 and rotatable together with the movable portion 122.

The movable portion 122 is rotated by the actuator 81. The drive of the actuator 81 is controlled by a control unit 80. The rotation angle of the movable portion 122 may be manually adjusted.

The reflection retarder 52A held by a holder 131 is disposed on the fixation stage 123. In addition, a plurality of reflection mirrors M2, M3, and M4 are disposed on the fixation stage 123. The reflection mirror M2 is held by a holder 132 and disposed on the fixation stage 123. The reflection mirror M3 is held by a holder 133 and disposed on the fixation stage 123. The reflection mirror M4 is held by a holder 134 and disposed on the fixation stage 123.

The rotation center axis C1 of the gonio stage 120 is aligned with the optical axis of the incident light L1in as the pulse laser beam L1 toward the reflection retarder 52A. The gonio stage 120 is a rotation mechanism configured to rotate the reflection retarder 52A about the optical axis of the incident light L1in. The gonio stage 120 can adjust the reflection direction of the reflected light L1out as the pulse laser beam L1 from the reflection retarder 52A to be at the angle θ relative to the Y axis on the XY plane. The Z axis coincides with the optical axis of the incident light L1in as the pulse laser beam L1 toward the reflection retarder 52A. The incident light L1in is light linearly polarized in a predetermined polarization direction parallel to the Y axis. The linear polarization direction of the incident light L1in is included in the YZ plane.

The reflection mirrors M2, M3, and M4 are disposed so that the optical axis direction of the elliptically polarized pulse laser beam L1 after being reflected by the reflection retarder 52A is substantially aligned with the optical axis direction of the incident light L1in as the pulse laser beam L1 toward the reflection retarder 52A.

The other configuration may be substantially same as that of the laser apparatus 3A according to the above-described comparative example.

[3.2 Operation]

The pulse laser beam L1 output from the amplifier PAk enters the polarization isolator 50A. The pulse laser beam L1 output from the amplifier PAk is light linearly polarized in the predetermined polarization direction, and is highly reflected by the reflection polarizer 51A.

After having been highly reflected by the reflection polarizer 51A, the pulse laser beam L1 is converted, through high reflection by the reflection retarder 52A, into elliptically polarized light having retardation that compensates retardation occurring at the propagation optical system 34A. This elliptically polarized pulse laser beam L1 passes through the propagation optical system 34A, and is focused through the laser focusing optical system 22a and applied on the target 27.

When the elliptically polarized pulse laser beam L1 is applied on the target 27, part of the pulse laser beam L1 is reflected by the target 27 to generate reflected light. The reflected light may become the returning laser beam L10 traveling backward through the propagation optical system 34A. The returning laser beam L10 may have elliptical polarization having a polarization direction opposite to elliptical polarization of the pulse laser beam L1 applied on the target 27. The returning laser beam L10 is collimated through the laser focusing optical system 22a, and may return in the opposite direction on an optical path identical to that of the pulse laser beam L1.

The oppositely elliptically polarized returning laser beam L10 is converted, through reflection by the reflection retarder 52A, into linearly polarized light orthogonal to the polarization direction of the incident light L1in as the pulse laser beam L1 toward the reflection retarder 52A. Accordingly, the returning laser beam L10 is absorbed by the reflection polarizer 51A. In addition, a linear polarization component of reflected light from an optical element including a window and an aperture and disposed on the optical path downstream of the polarization isolator 50A, the linear polarization component being orthogonal to the polarization direction of the pulse laser beam L1 incident on the reflection retarder 52A, is absorbed by the reflection polarizer 51A.

The arrangement adjusting of the reflection retarder 52A by the arrangement adjusting mechanism may be performed based on a result of measurement performed in advance on retardation occurring at the propagation optical system 34A. Alternatively, the disposition adjustment of the reflection retarder 52A may be performed based on a result of calculation performed on retardation occurring at the propagation optical system 34A.

The other operation may be substantially same as that of the laser apparatus 3A according to the above-described comparative example.

[3.3 Effects]

According to the laser apparatus according to Embodiment 1, the reflection direction of the reflected light L1out as the pulse laser beam L1 from the reflection retarder 52A is adjustable relative to the Y axis on the XY plane, and thus the reflection retarder 52A can be disposed to compensate retardation occurring at the propagation optical system 34A. Accordingly, retardation occurring at the propagation optical system 34A can be compensated, and thus it is possible to sufficiently prevent the returning laser beam L10 from the target 27 from reaching the optical path upstream of the installation position of the polarization isolator 50A, in other words, the optical path on the master oscillator 110 side of the polarization isolator 50A. In addition, it is possible to sufficiently prevent propagation of reflected light from an optical element including a window and an aperture and disposed on the optical path downstream of the polarization isolator 50A, in other words, the optical path on the target 27 side of the polarization isolator 50. Moreover, the return light component of the ASE light of the laser amplifier is unlikely to return to the laser amplifier, and thus self-oscillation can be prevented. Accordingly, the gain of the laser amplifier can be increased to generate a pulse laser beam of higher power.

[3.4 Modification]

[3.4.1 Configuration]

Figure 7:
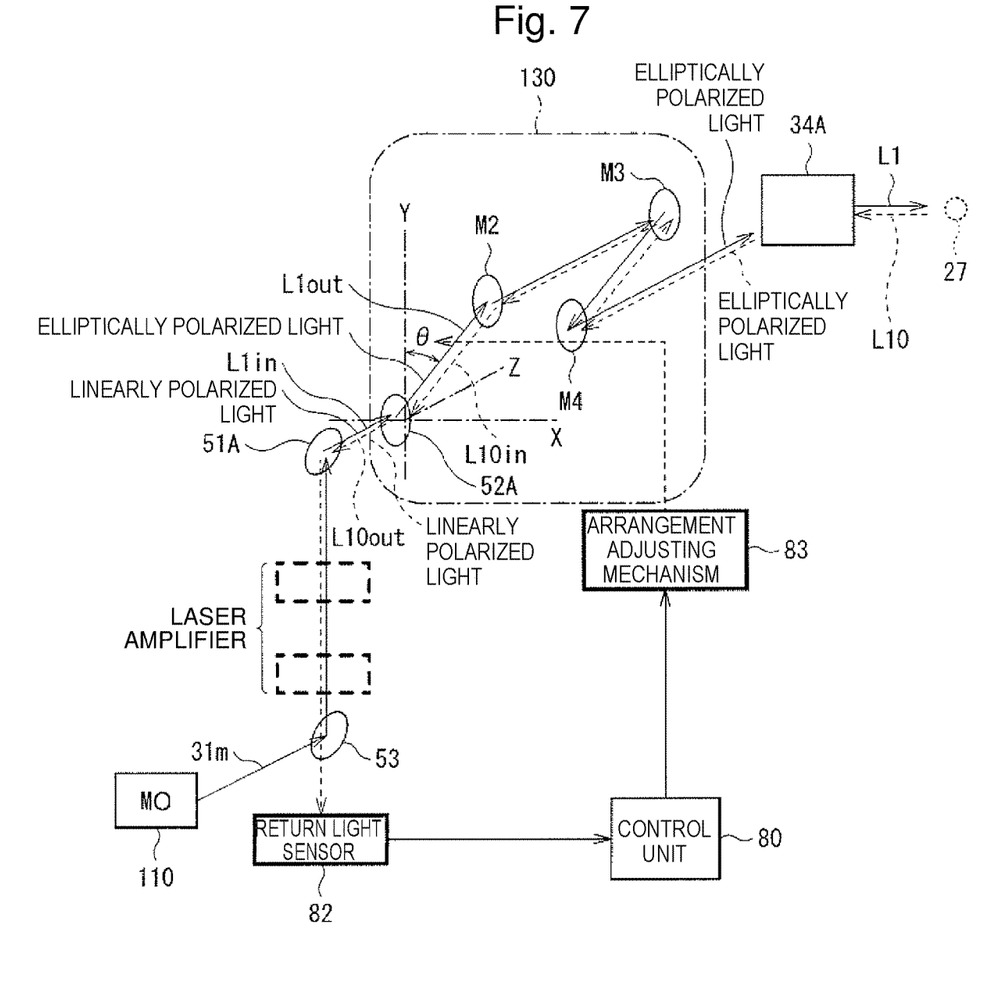
FIG. 7 schematically illustrates a modification of the arrangement adjusting mechanism of the reflection retarder in the laser apparatus according to Embodiment 1.

FIG. 7 schematically illustrates a modification of the arrangement adjusting mechanism of the reflection retarder 52A in the laser apparatus according to Embodiment 1.

The laser apparatus may include a light detection unit configured to detect the returning laser beam L10 from the target 27. The light detection unit is disposed on an optical path between the master oscillator 110 and the polarization isolator 50A. The light detection unit is preferably disposed on an optical path between the master oscillator 110 and the laser amplifier. When the light detection unit is disposed on the optical path between the master oscillator 110 and the laser amplifier, the returning laser beam L10 is amplified by the laser amplifier to facilitate detection of the returning laser beam L10.

The laser apparatus includes a mirror unit 130 including the reflection retarder 52A and the reflection mirrors M2, M3, and M4. The laser apparatus includes an arrangement adjusting mechanism 83 configured to adjust disposition of the mirror unit 130. As illustrated in FIG. 6, the arrangement adjusting mechanism 83 may include the gonio stage 120 and the actuator 81 configured to drive the gonio stage 120.

The light detection unit may include a return light sensor 82 and a beam splitter 53. The beam splitter 53 is an element disposed on the optical path between the master oscillator 110 and the polarization isolator 50A and configured to, for example, reflect the pulse laser beam 31m from the master oscillator 110 and partially transmit the returning laser beam L10.

The return light sensor 82 is disposed on the optical path of the returning laser beam L10 having passed through the beam splitter 53. The return light sensor 82 detects the light intensity of the returning laser beam L10. A result of the detection by the return light sensor 82 is output to the control unit 80.

[3.4.2 Operation]

The control unit 80 controls the arrangement adjusting mechanism 83 based on the output from the return light sensor 82. The control unit 80 controls the actuator 81 of the arrangement adjusting mechanism 83 to minimize the output value from the return light sensor 82. Accordingly, the returning laser beam L10 from the target 27 can be sufficiently prevented from reaching the optical path upstream of the installation position of the polarization isolator 50A, in other words, the optical path on the master oscillator 110 side of the polarization isolator 50A.

[3.4.3 Effects]

According to the laser apparatus of the modification, the return light sensor 82 detects the returning laser beam L10, and the control unit 80 controls the arrangement adjusting mechanism 83 based on a result of the detection to prevent the returning laser beam L10. Accordingly, the adjustment by the arrangement adjusting mechanism 83 is automated. The arrangement adjusting mechanism 83 can be automatically adjusted, for example, after alignment change due to maintenance of the laser apparatus or replacement of an optical element of the propagation optical system 34A.

Initial adjustment by the arrangement adjusting mechanism 83 may be manually performed, or automatically performed by the control unit 80 based on a result of the return light sensor 82.

<4. Embodiment 2> (Second Laser Apparatus Configured to Compensate Retardation of Propagation Optical System)

The following describes a laser apparatus according to Embodiment 2 of the present disclosure. Hereinafter, any component substantially identical to that of the laser apparatus according to the comparative example or Embodiment 1 described above is denoted by an identical reference sign, and description thereof will be omitted as appropriate.

[4.1 Configuration and Operation]

Figure 8:
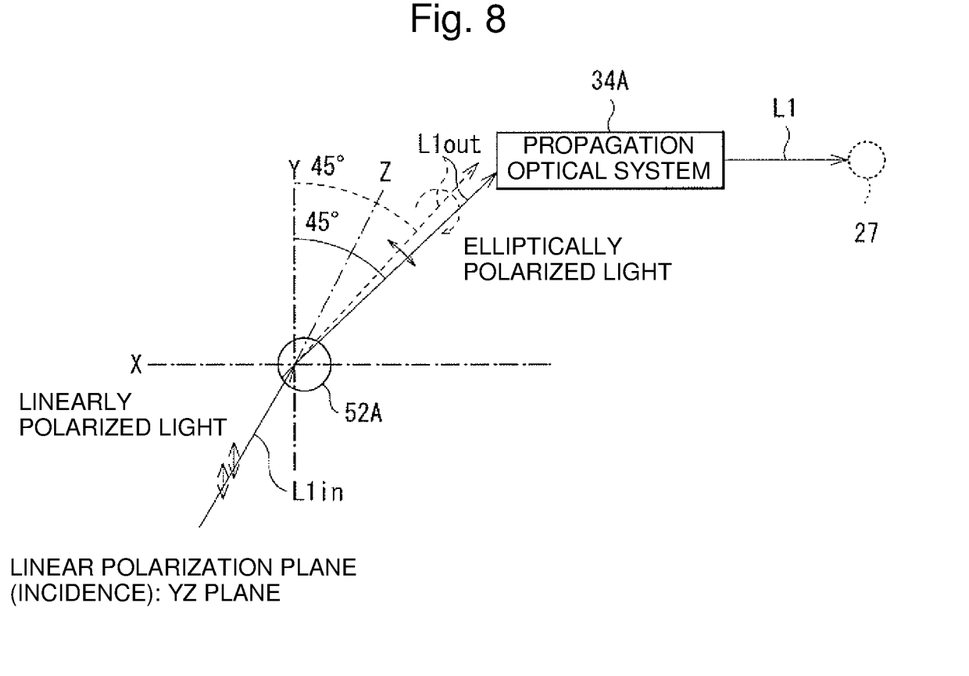
FIG. 8 schematically illustrates exemplary arrangement of a reflection retarder in a laser apparatus according to Embodiment 2.

FIG. 8 schematically illustrates exemplary arrangement of the reflection retarder 52A in the laser apparatus according to Embodiment 2.

In Embodiment 2, the disposition of the reflection retarder 52A is adjusted by rotating the reflection direction of the reflected light L1out as the pulse laser beam L1 from the reflection retarder 52A by an angle θa about the Y axis while the angle of 45° relative to the Y axis is maintained. The angle θa is an angle with which a laser beam linearly polarized in a predetermined polarization direction is converted into an elliptically polarized laser beam having retardation that compensates retardation occurring at the propagation optical system 34A. In Embodiment 1, the reflection direction of the reflected light L1out is adjusted in the XY plane as illustrated in FIGS. 5 and 6, but in Embodiment 2, the reflection direction of the reflected light L1out may be deviated from the XY plane.

Figure 9:
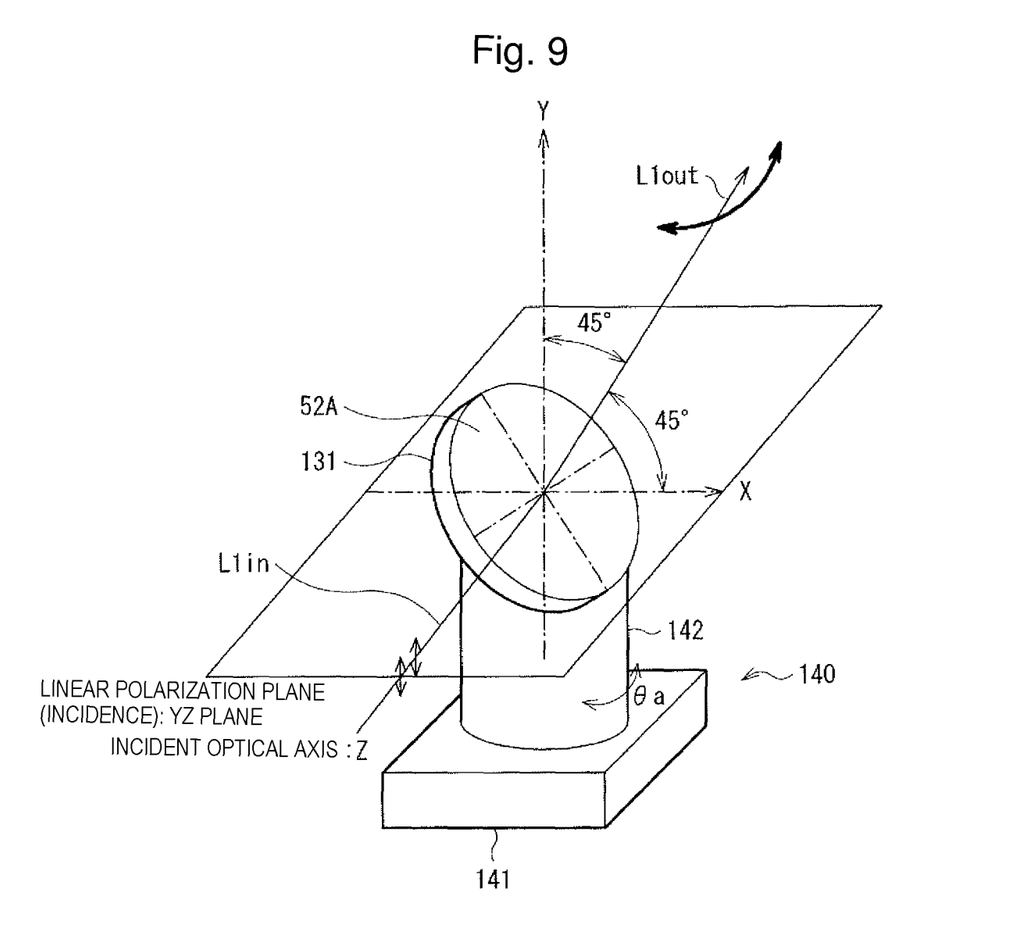
FIG. 9 schematically illustrates an exemplary configuration of an arrangement adjusting mechanism of the reflection retarder in the laser apparatus according to Embodiment 2.

FIG. 9 schematically illustrates an exemplary configuration of an arrangement adjusting mechanism of the reflection retarder 52A in the laser apparatus according to Embodiment 2.

The laser apparatus according to Embodiment 2 includes, as the arrangement adjusting mechanism of the reflection retarder 52A, a rotation mechanism configured to rotate the reflection retarder 52A about the Y axis. In the Embodiment 2, the Y axis is a predetermined axis passing through the intersection point between the incident optical axis of a laser beam linearly polarized in a predetermined polarization direction and a reflection surface of the reflection retarder 52A, and parallel to the polarization direction of linear polarization in the predetermined polarization direction. The incident optical axis of the laser beam linearly polarized in the predetermined polarization direction is the optical axis of the incident light L1in as the pulse laser beam L1 toward the reflection retarder 52A. The predetermined polarization direction is parallel to the Y axis.

The rotation mechanism includes a rotation stage 140 as illustrated in FIG. 9. The rotation stage 140 includes a fixation stage 141 and a column-shaped movable portion 142. The reflection retarder 52A held by the holder 131 is disposed on the movable portion 142. The movable portion 142 rotates the reflection retarder 52A about the Y axis by the angle θa.

The movable portion 142 is rotated by an actuator (not illustrated). Similarly to the arrangement adjusting mechanism in FIG. 6, the drive of the actuator is controlled by the control unit 80. The rotation angle of the movable portion 142 may be manually adjusted.

As in the exemplary configuration in FIG. 7, the return light sensor 82 may be provided, and the control unit 80 may automatically control the arrangement adjusting mechanism in FIG. 9 based on an output from the return light sensor 82.

The other configuration and operation may be substantially same as those of the laser apparatus according to the comparative example or Embodiment 1 described above.

[4.3 Effects]

According to the laser apparatus according to Embodiment 2, the reflection direction of the reflected light L1out as the pulse laser beam L1 from the reflection retarder 52A is adjustable through rotation about the Y axis by the angle θa while the angle of 45° relative to the Y axis is maintained, and thus the disposition of the reflection retarder 52A can be disposed to compensate retardation occurring at the propagation optical system 34A.

The other effects may be substantially same as those of the laser apparatus according to the comparative example or Embodiment 1 described above.

<5. Embodiment 3> (third laser apparatus configured to compensate retardation of propagation optical system)

The following describes a laser apparatus according to Embodiment 3 of the present disclosure. Hereinafter, any component substantially identical to that of the laser apparatus according to the comparative example or Embodiment 1 or 2 described above is denoted by an identical reference sign, and description thereof will be omitted as appropriate.

[5.1 Configuration and Operation]

Figure 10:
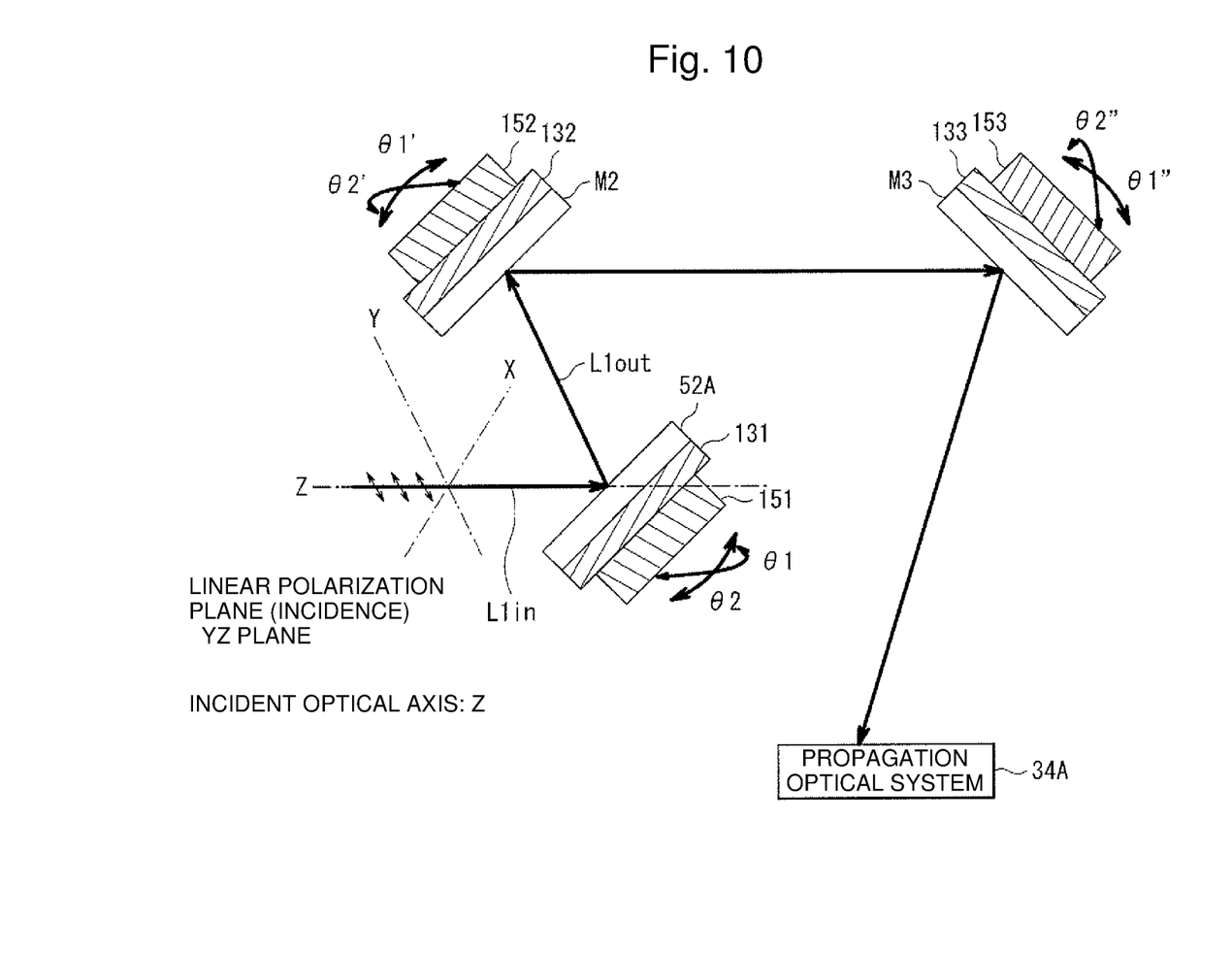
FIG. 10 schematically illustrates an exemplary configuration of an arrangement adjusting mechanism and a direction adjustment mechanism of a reflection retarder in a laser apparatus according to Embodiment 3.

FIG. 10 schematically illustrates an exemplary configuration of an arrangement adjusting mechanism and a direction adjustment mechanism of the reflection retarder 52A in the laser apparatus according to Embodiment 3.

The laser apparatus according to Embodiment 3 includes the arrangement adjusting mechanism of the reflection retarder 52A. The arrangement adjusting mechanism includes a rotation mechanism configured to rotate the reflection retarder 52A about the intersection point between the incident optical axis of a laser beam linearly polarized in a predetermined polarization direction and the reflection surface of the reflection retarder 52A.

The rotation mechanism includes a tilt stage 151. The reflection retarder 52A held by the holder 131 is disposed on the tilt stage 151.

The laser apparatus according to Embodiment 3 includes the direction adjustment mechanism configured to adjust the traveling direction of an elliptically polarized laser beam so that the incident optical axis of the elliptically polarized laser beam from the reflection retarder 52A toward the propagation optical system 34A is substantially constant. The direction adjustment mechanism includes the reflection mirrors M2 and M3 disposed on the optical path of the elliptically polarized laser beam.

The direction adjustment mechanism includes a tilt stage 152 and a tilt stage 153. The reflection mirror M2 held by the holder 132 is disposed on the tilt stage 152. The reflection mirror M3 held by the holder 133 is disposed on the tilt stage 153.

The tilt stages 151, 152, and 153 are each rotated by an actuator (not illustrated). Similarly to the arrangement adjusting mechanism in FIG. 6, the drive of the actuator is controlled by the control unit 80. The tilt angles of the tilt stages 151, 152, and 153 may be manually adjusted. Alternatively, as in the exemplary configuration in FIG. 7, the control unit 80 may automatically control the tilt angles of the tilt stages 151, 152, and 153 based on an output from the return light sensor 82.

The tilt stage 151 has tilt angles of θ1 and θ2. The tilt stage 152 has tilt angles of θ1' and θ2'. The tilt stage 153 has tilt angles of θ1" and θ2". The tilt angles θ1, θ1', and θ1" are angles in a plane parallel to the sheet of FIG. 10. The tilt angles θ2, θ2', and θ2" are angles in a direction penetrating through the sheet.

The incident light L1in as the pulse laser beam L1 toward the reflection retarder 52A is linearly polarized in parallel to the Y-axis direction. In FIG. 9, the Y axis is tilted by 45° toward the back side in the sheet. The pulse laser beam L1 is incident in the Z-axis direction on the sheet. The polarization direction of the incident light L1in as the pulse laser beam L1 toward the reflection retarder 52A is tilted by 45° relative to an entrance surface of the reflection retarder 52A. In FIG. 9, the entrance surface of the reflection retarder 52A is flush with the sheet.

When no angle adjustment is performed by the tilt stage 151, the incident angle of the pulse laser beam L1 on the reflection retarder 52A is 45°. In this case, the reflected light L1out from the reflection retarder 52A is converted into circularly polarized light and travels on the sheet.

The tilt angles θ1 and θ2 of the tilt stage 151 can be adjusted to convert the reflected light L1out from the reflection retarder 52A into elliptically polarized light having retardation that compensates retardation occurring at the propagation optical system 34A.

In this case, the reflected light L1out from the reflection retarder 52A travels on an optical path different from that when no angle adjustment is performed. Thus, the tilt stage 152 of the reflection mirror M2 and the tilt stage 153 of the reflection mirror M3 are adjusted in synchronization with adjustment of the tilt angles θ1 and θ2 of the tilt stage 151. Accordingly, the optical axis of the reflected light L1out output from the reflection mirror M3 can be substantially same as that of when no angle adjustment is performed by the tilt stage 151. In other words, the incident optical axis of the reflected light L1out from the reflection retarder 52A toward the propagation optical system 34A can be maintained substantially constant.

The other configuration and operation may be substantially same as those of the laser apparatus according to the comparative example or Embodiment 1 or 2 described above.

[5.2 Effects]

According to the laser apparatus according to Embodiment 3, the reflection direction of the reflected light L1out as the pulse laser beam L1 from the reflection retarder 52A is adjustable by the tilt stage 151, and thus the disposition of the reflection retarder 52A can be disposed to compensate retardation occurring at the propagation optical system 34A. In addition, since the direction adjustment mechanism configured to adjust the traveling direction of the reflected light L1out from the reflection retarder 52A is provided, the incident optical axis of the reflected light L1out from the reflection retarder 52A toward the propagation optical system 34A can be maintained substantially constant.

The other effects may be substantially same as those of the laser apparatus according to the comparative example or Embodiment 1 or 2 described above.

<6. Others>

The above description is intended to provide not restriction but examples. Thus, the skilled person in the art would clearly understand that the embodiments of the present disclosure may be changed without departing from the scope of the appended claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as having". Further, the modifier "a/an" described in the specification and the appended claims should be interpreted to mean "at least one" or "one or more".

What is claimed is:

1. A laser apparatus comprising:
   a master oscillator configured to emit a laser beam;
   a laser amplifier disposed on an optical path of the laser beam;
   a propagation optical system disposed on an optical path between the laser amplifier and a target supplied into an EUV chamber in which EUV light is generated;
   a polarization isolator disposed on an optical path between the laser amplifier and the propagation optical system, the polarization isolator including:
      a polarizer configured to emit, selecting from the laser beam incident on the polarizer, a laser beam linearly polarized in a predetermined polarization direction; and
      a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system; and
   a direction adjustment mechanism configured to adjust a traveling direction of the elliptically polarized laser beam so that an incident optical axis of the elliptically polarized laser beam on the propagation optical system is substantially constant.

2. A laser apparatus comprising:
   a master oscillator configured to emit a laser beam;
   a laser amplifier disposed on an optical path of the laser beam;
   a propagation optical system disposed on an optical path between the laser amplifier and a target supplied into an EUV chamber in which EUV light is generated;
   a polarization isolator disposed on an optical path between the laser amplifier and the propagation optical system, the polarization isolator including:
      a polarizer configured to emit, selecting from the laser beam incident on the polarizer, a laser beam linearly polarized in a predetermined polarization direction; and
      a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system; and
   an arrangement adjusting mechanism configured to adjust an orientation of the reflection retarder;
   wherein the arrangement adjusting mechanism includes a rotation mechanism configured to rotate the reflection retarder about an incident optical axis of the laser beam linearly polarized in the predetermined polarization direction.

3. A laser apparatus comprising:
- a master oscillator configured to emit a laser beam;
- a laser amplifier disposed on an optical path of the laser beam;
- a propagation optical system disposed on an optical path between the laser amplifier and a target supplied into an EUV chamber in which EUV light is generated;
- a polarization isolator disposed on an optical path between the laser amplifier and the propagation optical system, the polarization isolator including:
  - a polarizer configured to emit, selecting from the laser beam incident on the polarizer, a laser beam linearly polarized in a predetermined polarization direction; and
  - a reflection retarder disposed on an optical path between the polarizer and the propagation optical system to convert, through reflection, the laser beam linearly polarized in the predetermined polarization direction into an elliptically polarized laser beam having retardation that reduces retardation occurring at the propagation optical system;
- an arrangement adjusting mechanism configured to adjust an orientation of the reflection retarder; and
- a rotation mechanism configured to rotate the reflection retarder about an intersection point between an incident optical axis of the laser beam linearly polarized in the predetermined polarization direction and a reflection surface of the reflection retarder.

4. The laser apparatus according to claim 2, further comprising:
- a light detection unit disposed on an optical path between the master oscillator and the polarization isolator and configured to detect a returning laser beam from the target; and
- a control unit configured to control the arrangement adjusting mechanism based on a result of the detection by the light detection unit.

5. The laser apparatus according to claim 3, further comprising:
- a light detection unit disposed on an optical path between the master oscillator and the polarization isolator and configured to detect a returning laser beam from the target; and
- a control unit configured to control the arrangement adjusting mechanism based on a result of the detection by the light detection unit.

\* \* \* \* \*